(No Model.)
R. HARTMANN.
MIXING MACHINE.
No. 517,159.  Patented Mar. 27, 1894.
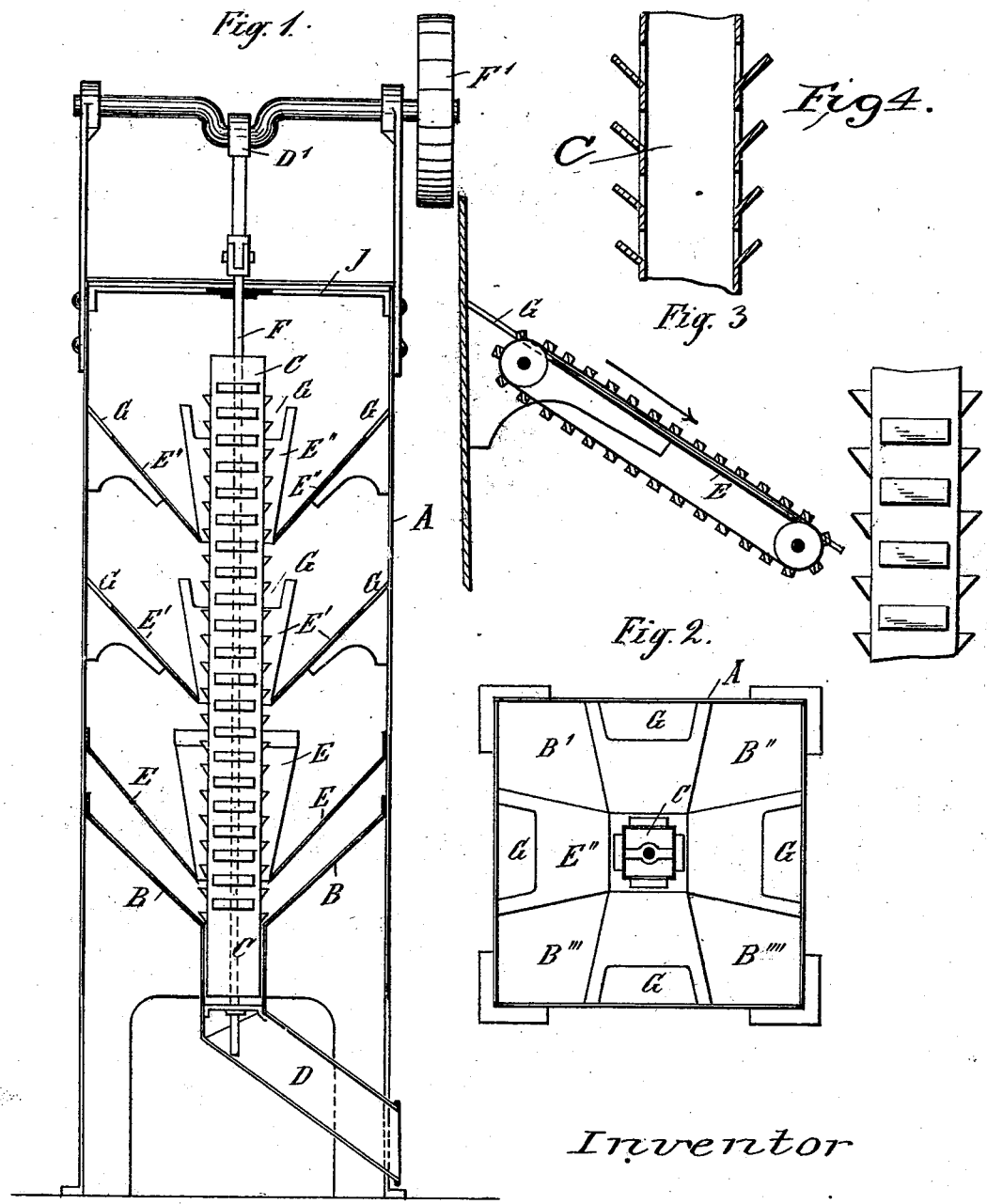
Witnesses:
E. B. Bolton
Madeline Supple
Inventor
Robert Hartmann
By
his Attorneys.

UNITED STATES PATENT OFFICE.

ROBERT HARTMANN, OF KERB'SCHE HÜHLE, NEAR DINGELSTÄDT, GERMANY.

MIXING-MACHINE.

SPECIFICATION forming part of Letters Patent No. 517,159, dated March 27, 1894.

Application filed July 11, 1893. Serial No. 480,114. (No model.)

*To all whom it may concern:*

Be it known that I, ROBERT HARTMANN, a subject of the King of Prussia, residing at Kerb'sche Hühle, near Dingelstädt, Prussia, Germany, have invented new and useful Improvements in Mixing-Machines for Grist of Any Kind, of which the following is a specification.

The invention includes a vertically reciprocating hollow shaft or tube having perforations and working centrally in a case containing the material to be mixed and inclined feed shelves or traveling aprons to direct the material from the sides of the casing to the central perforated tube where it passes through the perforations of the tube is mixed by the vertical reciprocation thereof and falls into a discharge tube from the lower end thereof.

The new arrangement is represented in the accompanying drawings, in which—

Figure 1 is a vertical section and Fig. 2 is a plan with the top removed. Fig. 3, is a view of an endless carrier adapted to assist in the mixing operation. Fig. 4, is a view of a detail.

The apparatus consists of a stationary vessel A of circular, rectangular, polygonal or other form in cross-section, with a conical bottom B, to the lower part of which is secured the outlet tube D. In the center of the vessel A is arranged a tube or hollow-shaft C; which extends the whole length of the apparatus. This tube or hollow shaft may be made of sheet metal provided with openings formed by cutting and bending outward the shell, or it may be made of wire-cloth, gauze or the like. The apertures of the tube or hollow shaft C which, to correspond with the varying degrees of pressure (*i. e.* from the inlet to the outlet) are gradually decreased in size as they approach the lower part of the apparatus, may be replaced by a wire-cloth or gauze the size of the meshes of which decreases gradually as they approach the lower part of the apparatus.

Above the conical bottom B of the vessel A are arranged inclined shelves E E' E² with openings G, between which are left openings B' B² B³ B⁴ and by which the materials to be mixed are divided into parallel columns, which stand on different bases in such a manner, that they move at different speeds toward the center of the vessel where they are proportionately mixed and discharged. The tube or hollow shaft C is connected with a crank D', eccentric or the like in such a manner, that it can be moved up and down. By this movement the materials which are pressed toward the tube or hollow shaft C are received by the tube or hollow shaft and mixed and discharged.

The up and down movement of the tube or hollow shaft has the advantage that the movement of the divided columns toward the center of the apparatus is assisted and the mixing and discharging process within the tube or hollow shaft of the vessel is accelerated, for the said up and down movement is along the line of the discharge movement of the material through the tube. For some kinds of material this increased movement is however not sufficient, for instance for "speltflour," which forms very easily into balls or lumps, so that it was hitherto impossible to mix it by machines. For such materials an endless band with transverse slats may be arranged on each of the inclined shelves E, as shown in Fig. 3 of the drawings, which band driven from the exterior, moves in the direction of the arrow (Fig. 3) toward the tube or hollow shaft.

Having now particularly described and ascertained the nature of the said invention and in what manner the same is to be performed, I declare that what I claim is—

1. In combination in a mixing machine, the casing, the perforated tube extending through the same and the means for reciprocating the said perforated tube whereby the material is caused to pass into the interior thereof to be mixed and discharged, substantially as described.

2. In combination, the casing, the central mixing tube therein, the means for moving the same and the endless traveling belts working laterally of the casing to convey the material to the tube, substantially as described.

3. In combination, the upright casing, the perforated mixing tube with means for reciprocating the same vertically in said casing, the inclined supports for directing the material laterally of the casing to the tube and the discharge tube leading from the lower end of the mixing tube, substantially as described.

In testimony whereof I have signed my name to this specification in the presence of two subscribing witnesses.

ROBERT HARTMANN.

Witnesses:
 EDWARD PEITZ,
 GUSTAV HÜLSMANN.